(No Model.)
J. P. FARLEY.
SELF CLOSING FAUCET.
No. 434,823. Patented Aug. 19, 1890.
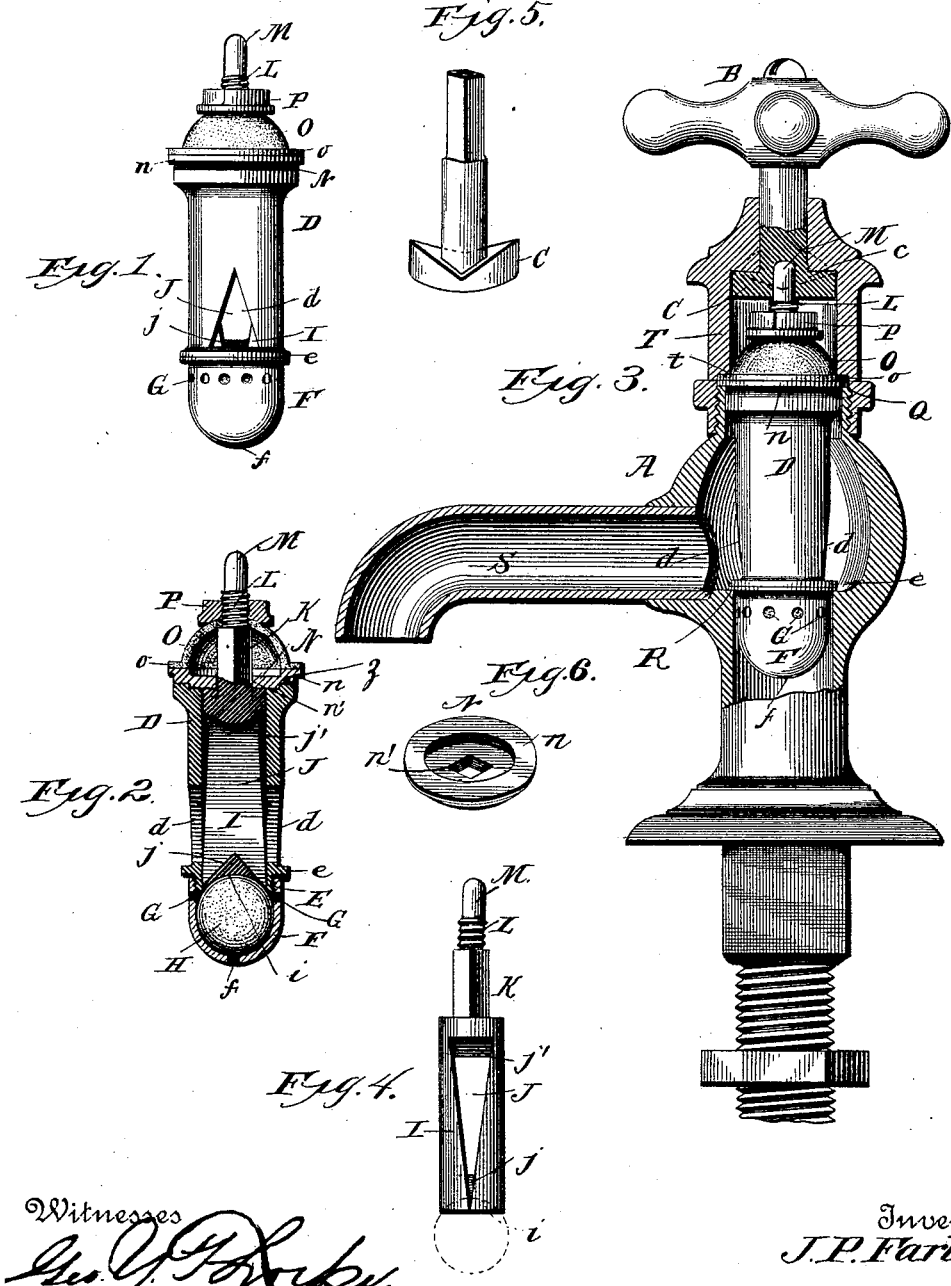
Witnesses
Geo. J. Thorpe
H. O. Price
Inventor
J. P. Farley.
By his Attorneys
Higdon & Higdon.

UNITED STATES PATENT OFFICE.

JOHN P. FARLEY, OF KANSAS CITY, MISSOURI.

SELF-CLOSING FAUCET.

SPECIFICATION forming part of Letters Patent No. 434,823, dated August 19, 1890.

Application filed April 26, 1890. Serial No. 349,628. (No model.)

*To all whom it may concern:*

Be it known that I, JOHN P. FARLEY, of Kansas City, Jackson county, Missouri, have invented certain new and useful Improvements in Self-Closing Faucets, of which the following is a full, clear, and exact description, reference being had to the accompanying drawings, forming a part hereof.

My invention relates to improvements in self-closing faucets; and it may be said to consist in the novel construction of the different parts, hereinafter more fully set forth and described, in which—

Figure 1 is a cylindrical casing. Fig. 2 is a sectional view of the cylindrical casing, showing its different interior arrangements, with the hollow plunger and hollow rubber ball-valve located in a cage at its lower end, with a rubber diaphragm located at its upper end. Fig. 3 is a sectional view in perspective of my faucet, showing the location of its interior and the cylindrical casing, with a cam which operates the plunger, causing the water to flow through the faucet. Fig. 4 is a plunger, showing the longitudinal V-shaped opening through it. Fig. 5 is the cam-stem with cam C attached. Fig. 6 is a disk with a square opening through its center, seen in position at the upper portion of the cylindrical casing at Fig. 2, which holds the stem K of the plunger from turning in either direction, so that the V-shaped opening through the plunger and the V-shaped openings in the cylindrical casing, which stand correspondingly, one with the other, so that when the plunger is forced down, forcing the rubber ball-valve below the openings seen in the ball-cage, admits of the water flowing in through the openings and passing out through the V-shaped openings in the plunger and the cylindrical casing.

Referring to the drawings by letter, A represents my self-closing faucet, and M the extreme upper portion of the plunger-neck.

C C are the upper and lower portions of the cam seen in the dotted lines, by which the plunger-rod is forced down, admitting the water to flow through the cylinder.

The upper portion M of the plunger-neck is screw-threaded at L to receive the top or nut P, which is screwed thereon and down and against the upper portion of the diaphragm. Upon a rotation of the handle B the cam C thereon will force it downward, permitting a flow of water, as before described, while upon a reverse movement of the handle it will assume its normal position, and in this operation diaphragm O and the annular valve at the lower portion of the plunger, operating in conjunction with each other, readily raise the plunger from its downward position, releasing the pressure from the hollow ball, allowing it to close on its upper seat.

T is the upper portion of the shell-casing of the faucet. *t* is a recess made in the lower portion of shell T, which when in operation rests firmly on the flange-rim of diaphragm O, in connection with disk N, holding them firmly in position when the upper and lower portion of the valve-shell are secured together at joint Q.

N is a disk. *n'* is a square opening through the center of the disk. D is a cylindrical casing in which the plunger is operated in connection with the ball-valve F.

*d d* are V-shaped openings through the sides of the cylindrical casing.

*e* is the flange on the lower portion of the cylindrical casing. R is a flange forming a packing over the joint between the cylindrical casing and the valve-cage. (Seen more clearly at Fig. 2.)

G is a series of openings in the valve-cage, through which the water passes when the plunger-rod is forced downward.

*f* is an opening in the lower portion of the valve-cage by which the water enters when the ball closes on its upper seat, thereby avoiding a sudden reaction of the water in the pipes, commonly known as the "water-hammer."

H is a rubber valve in position.

*i* is a concave face on the lower end of the plunger, forming an easy pressure on the ball-valve.

J is the V-shaped opening through the plunger.

*j* is a V-shaped extension at the upper portion of the V-shaped opening. These V-shaped portions, in connection with the V-shaped openings through the plunger, admit the water to flow in and out through the V-shaped openings freely.

K is a square portion of the stem attached to the plunger.

$n$ is a level surface on the disk on which the diaphragm rests.

$z$ is a lug attached to the under side of the disk near the rim, which drops in an opening made in the cylindrical casing to hold the disk from turning, thereby holding the V-shaped openings in position.

S is a discharge in connection with the faucet-shell.

Having thus fully described my invention, what I claim as new, and desire to secure by Letters Patent, is—

1. The combination, with a faucet-casing, of a cylindrical casing having slotted sides and a perforated valve-cage on its base contained therein, a ball contained in the said cage, a diaphragm above the said cylindrical casing, and a slotted plunger contained within the cylindrical casing and bearing upon the said ball, and having a nut thereon bearing upon the said diaphragm, the slots in the said plunger and cylindrical casing being of the shape of a V, as described.

2. The combination, with a faucet-casing, of a cylindrical casing having a valve-cage on its base contained therein, the said cylindrical casing having inverted-V-shaped slots in its sides and the said cage having perforations in its sides and its base, a ball contained in the said cage, a plunger contained in the said casing and having on its base a rounded seat for the said ball and having a V-shaped slot therein, a diaphragm on top of the said cylindrical casing, and an adjustable nut on the said plunger and bearing upon the said diaphragm, as described.

In testimony whereof I affix my signature in presence of two witnesses.

JOHN P. FARLEY.

Witnesses:
R. B. FARLEY,
GEO. Y. THORPE.